US008836691B2

(12) United States Patent
Ryu et al.

(10) Patent No.: US 8,836,691 B2
(45) Date of Patent: Sep. 16, 2014

(54) ORGANIC LIGHT EMITTING DISPLAY WITH PIXEL SENSING CIRCUIT AND DRIVING METHOD THEREOF

(75) Inventors: Do-Hyung Ryu, Yongin (KR); Keum-Nam Kim, Yongin (KR); Sang-Moo Choi, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 609 days.

(21) Appl. No.: 12/768,886

(22) Filed: Apr. 28, 2010

(65) Prior Publication Data

US 2011/0007067 A1 Jan. 13, 2011

(30) Foreign Application Priority Data

Jul. 10, 2009 (KR) ........................ 10-2009-0063095

(51) Int. Cl.
*G06F 3/038* (2013.01)
*G09G 5/00* (2006.01)
*G09G 3/32* (2006.01)

(52) U.S. Cl.
CPC ............ *G09G 3/3233* (2013.01); *G09G 3/3266* (2013.01); *G09G 2300/0861* (2013.01); *G09G 3/3291* (2013.01); *G09G 2300/0819* (2013.01); *G09G 2320/0295* (2013.01)
USPC ............................................ 345/214; 345/76

(58) Field of Classification Search
USPC .................................................... 345/76, 214
See application file for complete search history.

(56) References Cited

U.S. PATENT DOCUMENTS

2008/0231562 A1* 9/2008 Kwon ............................ 345/77
2008/0252568 A1* 10/2008 Kwon ............................ 345/76
2009/0179831 A1* 7/2009 Yamashita et al. .............. 345/76
2010/0118002 A1* 5/2010 Yamashita et al. ............ 345/205

FOREIGN PATENT DOCUMENTS

KR 10-2006-0085374 A 7/2006
KR 1020080041278 A 5/2008
KR 100846970 B1 7/2008
KR 100858615 B1 9/2008
KR 1020090020190 A 2/2009

OTHER PUBLICATIONS

Korean Office Action dated Sep. 30, 2011 issued in Korean Priority Application No. 10-2009-0063095, 1 page.

* cited by examiner

*Primary Examiner* — Kwang-Su Yang
(74) *Attorney, Agent, or Firm* — Christie, Parker & Hale, LLP

(57) ABSTRACT

An organic light emitting display that can stably extract information from pixels. A driving method of the organic light emitting display includes: generating first digital values by sensing deterioration information of organic light emitting diodes respectively included in a plurality of pixels coupled to a data line during two or more continuous frame periods; storing the first digital values in a memory; generating second digital values by sensing threshold voltage and mobility information of driving transistors respectively included in the pixels during two or more continuous frame periods; storing the second digital values in the memory; converting input data into calibration data according to the information stored in the memory to display an image having a uniform brightness, irrespective of the deterioration information of the organic light emitting diodes and the threshold voltage and mobility information of the driving transistors; and supplying a data signal in accordance with the calibration data to the data line.

7 Claims, 10 Drawing Sheets

ORGANIC LIGHT EMITTING DISPLAY WITH PIXEL SENSING CIRCUIT AND DRIVING METHOD THEREOF

CROSS-REFERENCE TO RELATED APPLICATIONS

This application claims priority to and the benefit of Korean Patent Application No. 10-2009-0063095, filed on Jul. 10, 2009, in the Korean Intellectual Property Office, the entire content of which is incorporated herein by reference.

BACKGROUND

1. Field

Embodiments of the present invention relate to an organic light emitting display and a driving method thereof.

2. Description of Related Art

Recently, various types of flat panel display with reduced weight and volume in comparison to a cathode ray tube display have been developed. The various types of flat panel display include a liquid crystal display, a field emission display, a plasma display panel, an organic light emitting display, etc.

Among others, the organic light emitting display displays an image using organic light emitting diodes that generate light by recombination of electrons and holes. Such an organic light emitting display can be driven at low power consumption with rapid response speed.

FIG. 1 is a schematic circuit view of a pixel 4 of an organic light emitting display in the related art.

Referring to FIG. 1, the pixel 4 of the organic light emitting display in the related art includes an organic light emitting diode OLED, and a pixel circuit 2 that is coupled to a data line Dm and a scan line Sn to control the organic light emitting diode OLED.

The anode electrode of the organic light emitting diode OLED is coupled to the pixel circuit 2, and the cathode electrode thereof is coupled to a second power supply ELVSS. Such an organic light emitting diode OLED emits light at a brightness corresponding to the current supplied from the pixel circuit 2.

When a scan signal is supplied to the scan line Sn, the pixel circuit 2 controls the amount of current supplied to the organic light emitting diode OLED corresponding to a data signal supplied to the data line Dm.

To this end, the pixel circuit 2 includes a second transistor M2 coupled between a first power supply ELVDD and the organic light emitting diode OLED, a first transistor M1 coupled to the data line Dm and the scan line Sn, and a storage capacitor Cst coupled between the gate electrode and the first electrode of the second transistor M2.

The gate electrode of the first transistor M1 is coupled to the scan line Sn, and the first electrode thereof is coupled to the data line Dm. The second electrode of the first transistor M1 is coupled to one terminal of the storage capacitor Cst.

Herein, the first electrode is set to any one of the source electrode and the drain electrode, and the second electrode is set to the other electrode. For example, if the first electrode is set to the source electrode, the second electrode is set to the drain electrode. When the scan signal is supplied from the scan line Sn, the first transistor M1 is turned on to supply the data signal supplied from the data line Dm to the storage capacitor Cst. At this time, the storage capacitor Cst is charged with the voltage corresponding to the data signal.

The gate electrode of the second transistor M2 is coupled to one terminal of the storage capacitor Cst, and the first electrode thereof is coupled to the other terminal of the storage capacitor Cst and the first power supply ELVDD. The second electrode of the second transistor M2 is coupled to the anode electrode of the organic light emitting diode OLED.

The second transistor M2 controls the amount of current flowing to the second power supply ELVSS from the first power supply ELVDD via the organic light emitting diode OLED, corresponding to the voltage value stored in the storage capacitor Cst. Here, the organic light emitting diode OLED generates light corresponding to the amount of current supplied from the second transistor M2.

However, the above described organic light emitting display in the related art has a problem that it cannot display an image with a desired brightness due to the change in efficiency of the organic light emitting diode OLED as it deteriorates.

As the organic light emitting diode OLED deteriorates over time, the brightness of light generated by the OLED is gradually lowered corresponding to the same data signal. Also, the related art has a problem that an image having a uniform brightness cannot be displayed due to non-uniformity in threshold voltage/mobility of the driving transistor M2 included in the respective pixels 4.

In order to solve the above described problems, it is known to extract the deterioration information of the organic light emitting diode, while supplying current to the organic light emitting diode, and extract the threshold voltage and mobility information of the second transistor M2, while sinking current.

However, when extracting the deterioration information of the organic light emitting diode and the threshold voltage information of the second transistor M2 using current, a problem arises in that information of pixels coupled to some scan lines is unstably extracted. More specifically, there is parasitic capacitance between the data lines and the pixels, wherein only when the parasitic capacitance are sufficiently charged, desired information can be extracted from the pixels. However, problems arise in that a predetermined time is required to charge the parasitic capacitance using current, and exact (or accurate) information cannot be extracted from the pixels where information is extracted during the charging time of the parasitic capacitance (actually, exact information is not extracted from the pixels where information is extracted at a timing relatively shorter than a time constant of the resistive component of the data line and the parasitic capacitance).

SUMMARY OF THE INVENTION

Therefore, aspects of embodiments of the present invention are directed toward an organic light emitting display that can extract information stably from a pixel, and a driving method thereof.

According to an embodiment of the present invention, there is provided a driving method of an organic light emitting display. The method includes: generating first digital values by sensing deterioration information of organic light emitting diodes respectively included in a plurality of pixels during two or more continuous frame periods; storing the first digital values in a memory; generating second digital values by sensing threshold voltage and mobility information of driving transistors respectively included in the pixels coupled to a data line during two or more continuous frame periods; storing the second digital values in the memory; converting input data into calibration data according to the information stored in the memory to display an image having a uniform brightness, irrespective of the deterioration information of the organic light emitting diodes and the threshold voltage and mobility information of the driving transistors; and supplying a data signal in accordance with the calibration data to the data line.

The generating the first digital values and the storing the first digital values may include: generating the first digital values corresponding to the deterioration information of the organic light emitting diodes respectively included in the pixels during a j-th frame period, wherein j is a natural number; storing the first digital values in the memory; generating the first digital values corresponding to the deterioration information of the organic light emitting diodes respectively included in the pixels during a (j+1)-th frame period; and deleting the first digital values stored in the j-th frame period and updating the information of the memory with the first digital values generated during the (j+1)-th frame period. The generating the second digital values and the storing the second digital values may include: generating the second digital values corresponding to the threshold voltage and mobility information of the driving transistors respectively included in the pixels during a k-th frame period, wherein k is a natural number; storing the second digital values in the memory; generating second digital values corresponding to the threshold voltage and mobility information of the driving transistors respectively included in the pixels during a (k+1)-th frame period; and deleting the second digital values stored in the k-th frame period and updating the information of the memory with the second digital values generated during the (k+1)-th frame period.

According to another embodiment of the present invention, there is provided a driving method of an organic light emitting display. The method includes: charging parasitic capacitance of data lines using a precharge voltage during a porch period that is positioned between a frame and a next frame; generating first digital values by sensing deterioration information of organic light emitting diodes respectively included in a plurality of pixels coupled to the data lines; storing the first digital values in a memory; charging the parasitic capacitance of the data lines using the precharge voltage during the porch period; generating second digital values by sensing threshold voltage and mobility information of driving transistors respectively included in the pixels; storing the second digital values in the memory; converting input data into calibration data according to the information stored in the memory to display an image having a uniform brightness, irrespective of the deterioration information of the organic light emitting diodes and the threshold voltage and mobility information of the driving transistors; and supplying data signals in accordance with the calibration data to the data lines.

The precharge voltage may be set to have a voltage value so that the parasitic capacitance can be stably charged during the porch period. The generating the first digital values may include: supplying a first current to each of the organic light emitting diodes; and converting a first voltage applied to each of the organic light emitting diodes in response to the first current into the first digital values. The generating the second digital values may include: sinking a second current via each of the driving transistors; and converting a second voltage applied to the gate electrode of each of the driving transistors in response to the second current into the second digital values.

According to another embodiment of the present invention, there is provided an organic light emitting display including: a plurality of pixels at crossing regions of data lines, scan lines, and light emitting control lines; a sensing unit for sensing deterioration information of organic light emitting diodes and threshold voltage and mobility information of driving transistors respectively included in the pixels; a converting unit for storing the deterioration information of the organic light emitting diodes and the threshold voltage and mobility information of the driving transistors that are sensed by the sensing unit, and converting input data into calibration data according to the deterioration information and the threshold voltage and mobility information; and a data driver for receiving calibration data output from the converting unit to generate a data signal, wherein the sensing unit includes: a sensing circuit including a current source unit coupled to a channel to supply a current, one or more current sink units for sinking a current, and a precharge voltage source for supplying a precharge voltage; and at least one analog-digital converter for converting the deterioration information of the organic light emitting diodes supplied from the sensing circuit into first digital values and converting the threshold voltage and mobility information of the driving transistors into second digital values.

The sensing circuit may include switching elements respectively coupled to the current source unit, the current sink unit, and the precharge voltage source.

With the organic light emitting display and the driving method thereof according to the above embodiments, the deterioration information of the organic light emitting diodes, and the threshold voltage and mobility information of the driving transistors can be obtained stably, irrespective of the positions of the pixels. Therefore, the organic light emitting display according to the embodiments of the present invention can display an image having a uniform brightness, irrespective of the deterioration information of the organic light emitting diodes and the threshold voltage and mobility information of the driving transistors.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
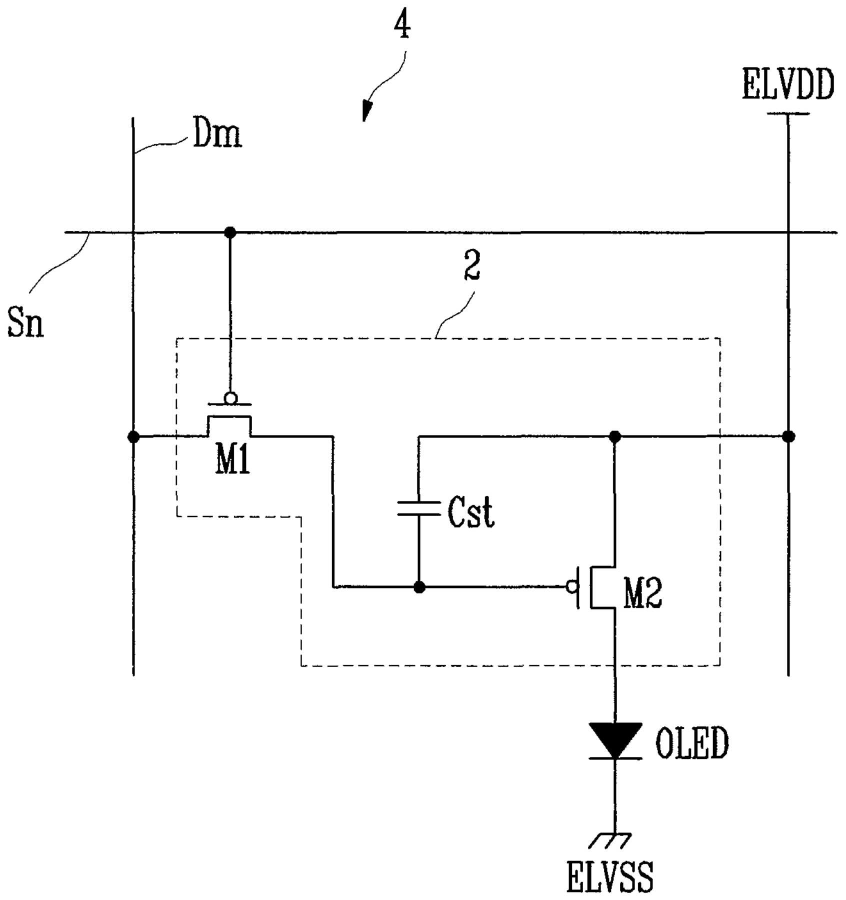
FIG. 1 (PRIOR ART)
FIG. 1 is a schematic circuit view of a pixel of an organic light emitting display in the related art.

Hereinafter, certain exemplary embodiments according to the present invention will be described with reference to the accompanying drawings. Here, when a first element is described as being coupled to or connected to a second element, the first element may be directly coupled to the second element or may be indirectly coupled to the second element via a third element. Further, some of the elements that are not essential to a complete understanding of the invention are omitted for clarity. Also, like reference numerals refer to like elements throughout.

Hereinafter, exemplary embodiments of the present invention will be described in more detail with reference to the accompanying drawings of FIG. 2 to FIG. 11.

Figure 2:
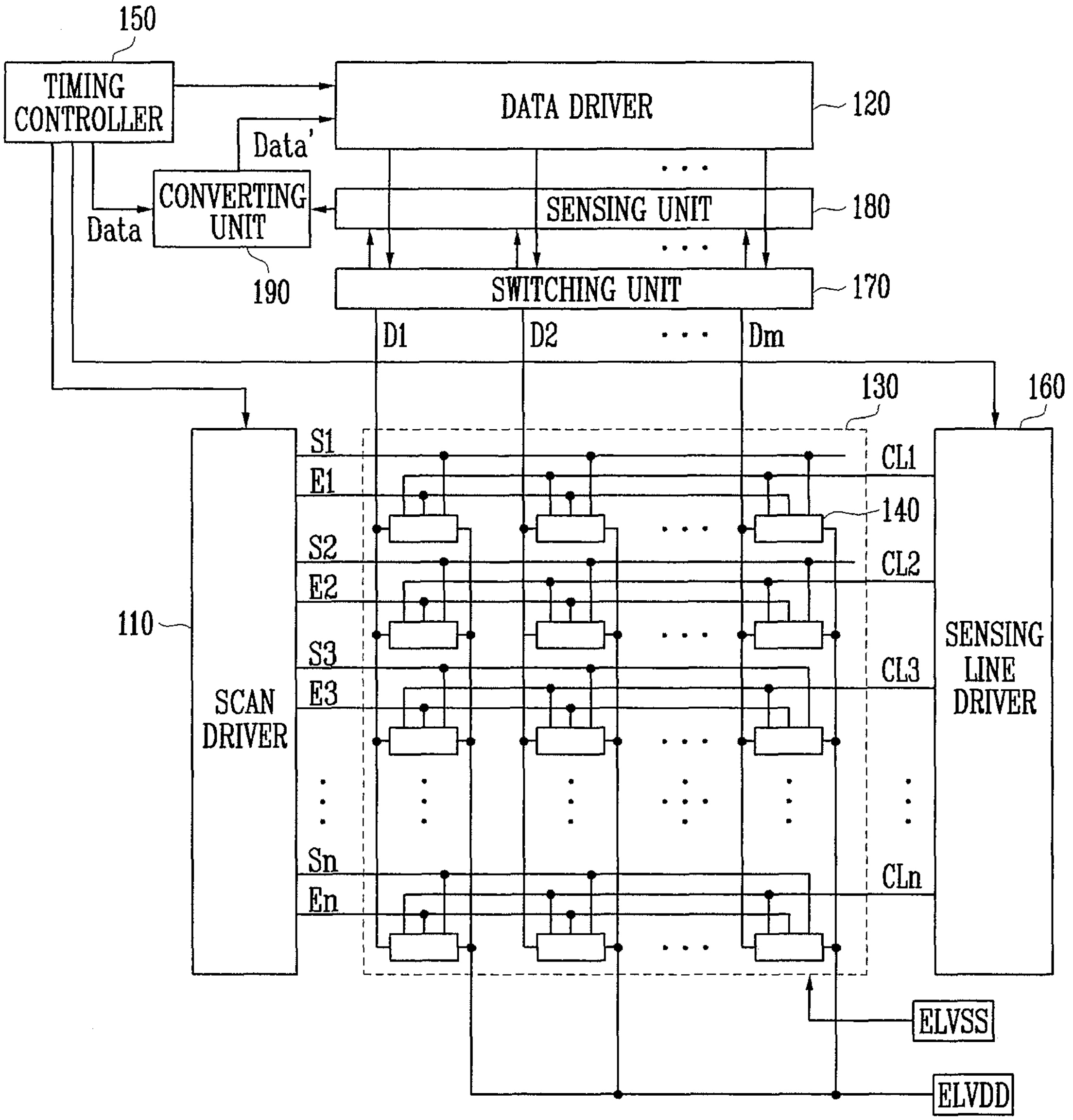
FIG. 2 is a schematic block diagram showing an organic light emitting display according to an embodiment of the present invention.

FIG. 2 is a block diagram showing an organic light emitting display according to an embodiment of the present invention.

Referring to FIG. 2, the organic light emitting display according to one embodiment of the present invention includes a display unit 130 that includes pixels 140 coupled to scan lines S1 to Sn, light emitting control lines E1 to En, sensing lines CL1 to CLn, and data lines D1 to Dm, a scan driver that drives the scan lines S1 to Sn and the light emitting control lines E1 to En, a sensing line driver 160 that drives the sensing lines CL1 to CLn, a data driver 120 that drives the data lines D1 to Dm, and a timing controller 150 that controls the scan driver 110, the data driver 120, and the sensing line driver 160.

The organic light emitting display of FIG. 2 further includes a sensing unit 180 that extracts the deterioration information of an organic light emitting diode and the threshold voltage and mobility information of a driving transistor, included in the respective pixels 140, a switching unit 170 that couples the sensing unit 180 and the data driver 120 selectively to the data lines D1 to Dm, and a converting unit 190 that stores the information sensed by the sensing unit 180 and converts input data according to the sensed information so that an image having a uniform brightness can be displayed, irrespective of the deterioration information of the organic light emitting diode and the threshold voltage and mobility information of the driving transistor.

The display unit 130 includes the pixels 140 that are positioned at crossing regions of the scan lines S1 to Sn, the light emitting control lines E1 to En, and the data lines D1 to Dm. The pixels 140 receive a first power ELVDD and a second power ELVSS from the outside. The pixels 140 control the amount of current supplied from the first power supply ELVDD to the second power supply ELVSS via the organic light emitting diode in accordance with the data signals. Then, light having a corresponding brightness is generated from the organic light emitting diode.

The scan driver 110 supplies the scan signals to the scan lines S1 to Sn by the control of the timing controller 150. Also, the scan driver 110 supplies the light emitting control signals to the light emitting control lines E1 to En by the control of the timing controller 150.

The sensing line driver 160 supplies the sensing signals to the sensing lines CL1 to CLn by the control of the timing controller 150.

The data driver 120 supplies the data signals to the data lines D1 to Dm by the control of the timing controller 150.

The switching unit 170 couples the sensing unit 180 and the data driver 120 selectively to the data lines D1 to Dm. To this end, the switching unit 170 includes a pair of switching devices each coupled to the data lines D1 to Dm (that is, for each channel).

The sensing unit 180 extracts the deterioration information of the organic light emitting diodes respectively included in the pixels 140 and supplies the extracted deterioration information to the converting unit 190. Also, the sensing unit 180 extracts the threshold voltage and mobility information of the driving transistors respectively included in the pixels 140 and supplies the extracted threshold voltage and mobility information of the driving transistors to the converting unit 190. To this end, the sensing unit 180 includes sensing circuits coupled to each of the data lines D1 to Dm (that is, for each channel).

Herein, according to an embodiment of the present invention, the extraction of the deterioration information of the organic light emitting diodes is performed during a first non-display time before an image is displayed after power is applied to the organic light emitting display. In other words, the extraction of the deterioration information of the organic light emitting diodes can be performed whenever power is applied to the organic light emitting display.

To the contrary, the extraction of the threshold voltage and mobility information of the driving transistors can be performed not only during a second non-display time before an image is displayed after power is applied to the organic light emitting display but also prior to a period before the original organic light emitting display is released as a product, such that the threshold voltage and mobility information of the driving transistors can be provided as preset information at the time of release of the product. In other words, the extraction of the threshold voltage and mobility information of the driving transistors is performed whenever power is applied to the organic light emitting display, or the performance result thereof is previously stored before the product thereof is released, making it possible to use the pre-stored information, without performing the extraction of the threshold voltage and mobility information whenever power is applied.

The converting unit 190 stores the deterioration information and the threshold voltage and mobility information supplied from the sensing unit 180. Herein, the converting unit 190 stores the deterioration information of the organic light emitting diode and the threshold voltage and mobility information of the driving transistor, included in the respective pixels 140. To this end, according to an embodiment of the present invention, the converting unit 190 includes a memory and a converting circuit that converts data input Data from the timing controller 150 to calibration data Data' so that an image having a uniform brightness can be displayed, irrespective of the deterioration information of the organic light emitting diode and the threshold voltage and mobility information of the driving transistor, using the information stored in the memory.

The timing controller 150 controls the data driver 120, the scan driver 110, and the sensing line driver 160.

Further, the data input Data from the outside to be output from the timing controller 150 is converted into the calibration data Data' in order to compensate for the deterioration of the organic light emitting diode and the threshold voltage and mobility information of the driving transistor, and the data Data' is supplied to the data driver 120. Then, the data driver 120 generates the data signals using the converted calibration data Data' and supplies the generated data signals to the pixels 140.

Figure 3:
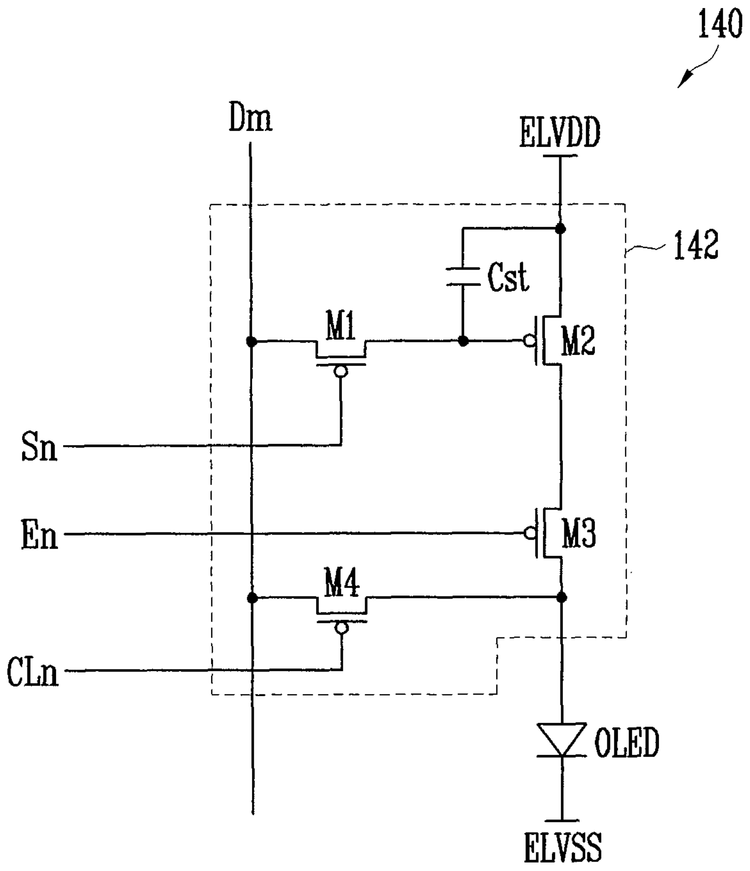
FIG. 3 is a schematic circuit view of the pixel of FIG. 2.

FIG. 3 is a schematic circuit view of the pixel of FIG. 2, wherein, for convenience of explanation, a pixel coupled to the m-th data line Dm and the n-th scan line Sn will be described.

Referring to FIG. 3, the pixel 140 according to the embodiment of the present invention includes an organic light emitting diode OLED and a pixel circuit 142 that supplies current to the organic light emitting diode OLED.

The anode electrode of the organic light emitting diode OLED is coupled to the pixel circuit 142, and the cathode electrode thereof is coupled to a second power supply ELVSS. The organic light emitting diode OLED generates light having a brightness (e.g., a predetermined brightness) corresponding to the current supplied from the pixel circuit 142.

When a scan signal is supplied to the scan line Sn, the pixel circuit 142 receives a data signal supplied to the data line Dm. Also, when a sensing signal is supplied to a sensing line CLn, the pixel circuit 142 supplies the deterioration information of the organic light emitting diode OLED or the threshold voltage and mobility information of a driving transistor (that is, a second transistor M2) to a sensing unit 180. To this end, the pixel circuit 142 includes four transistors M1 to M4 and a storage capacitor Cst.

The gate electrode of the first transistor M1 is coupled to the scan line Sn, and the first electrode thereof is coupled to the data line Dm. The second electrode of the first transistor M1 is coupled to a first terminal of the storage capacitor Cst. When the scan signal is supplied to the scan line Sn, the first transistor M1 is turned on. Herein, the scan signal is supplied during the period when the threshold voltage and mobility information of the second transistor M2 is sensed, that is, during the period when the data signal is stored in the storage capacitor Cst.

The gate electrode of the second transistor M2 is coupled to the first terminal of the storage capacitor Cst, and the first electrode thereof is coupled to a second terminal of the storage capacitor Cst and a first power supply ELVDD. The second transistor M2 controls the amount of current flowing to a second power supply ELVSS from the first power supply ELVDD via the organic light emitting diode OLED, corresponding to the voltage value stored in the storage capacitor Cst. Here, the organic light emitting diode OLED generates light corresponding to the amount of current supplied from the second transistor M2.

The gate electrode of the third transistor M3 is coupled to a light emitting control line En, and the first electrode thereof is coupled to the second electrode of the second transistor M2. The second electrode of the third transistor M3 is coupled to the organic light emitting diode OLED. When the light emitting control signal is supplied to the light emitting control line En, the third transistor M3 is turned on, and when the light emitting control signal is not supplied to the light emitting control line En, the third transistor M3 is turned off. Herein, the light emitting control signal is supplied during the period when the voltage corresponding to the data signal is charged in the storage capacitor Cst and during the period when the deterioration information of the organic light emitting diode OLED is sensed.

The gate electrode of the fourth transistor M4 is coupled to the sensing line CLn, and the first electrode thereof is coupled to the second electrode of the third transistor M3. Also, the second electrode of the fourth transistor M4 is coupled to the data line Dm. The fourth transistor M4 is turned on when the sensing signal is supplied to the sensing line CLn, and is turned off in other cases. Herein, the sensing signal is supplied during the period when the deterioration information of the organic light emitting diode OLED is sensed and during the period when the threshold voltage and mobility information of the second transistor M2 is sensed.

Figure 4:
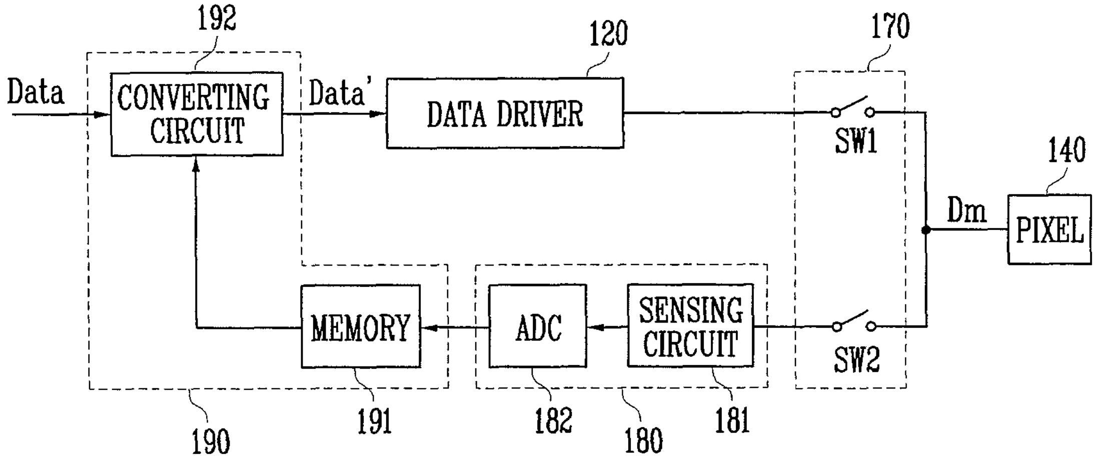
FIG. 4 is a detailed block diagram showing the switching unit, the sensing unit, and the converting unit of FIG. 2.

FIG. 4 is a detailed block diagram showing the switching unit, the sensing unit, and the converting unit of FIG. 2. For convenience of explanation, FIG. 4 will show a constitution wherein they are coupled to the m-th data line Dm.

Referring to FIG. 4, a pair of switching elements SW1 and SW2 are provided in the respective channels of the switching unit 170. A sensing circuit 181 and an analog-digital converter (hereinafter, referred to as "ADC") 182 are provided in the respective channels of the sensing unit 180 (herein, one ADC may be used for the plurality of channels or one ADC may be shared by all of the channels). The converting unit 190 includes a memory 191 and a converting circuit 192.

The first switching element SW1 of the switching unit 170 is positioned between a data driver 120 and the data line Dm. The first switching element SW1 is turned on when a data signal is supplied through the data driver 120. In other words, the first switching element SW1 maintains a turn-on state during the period when the organic light emitting display displays an image.

The second switching element SW2 of the switching unit 170 is positioned between the sensing unit 180 and the data line Dm. The second switching element SW2 is turned on during the period when the deterioration information of the organic light emitting diode OLED or the threshold voltage and mobility information of the second transistor M2 is sensed by the sensing unit 180 from the respective pixels 140.

Here, the second switching element SW2 maintains a turn-on state during the non-display time before an image is displayed after power is applied to the organic light emitting display or maintains a turn-on state during the non-display time before the display is released as a product.

In one embodiment of the present invention, the sensing of the deterioration information of the organic light emitting diode OLED is performed during a first non-display time before the image is displayed after power is applied to the organic light emitting display. In other words, the sensing of the deterioration information of the organic light emitting diode OLED may be performed whenever power is applied to the organic light emitting display.

In addition, when the threshold voltage and mobility information of the driving transistor is sensed, it may be performed prior to a second non-display time before an image is displayed after power is applied to the organic light emitting display, or it may be performed before the original organic light emitting display is released as a product.

Figure 5:
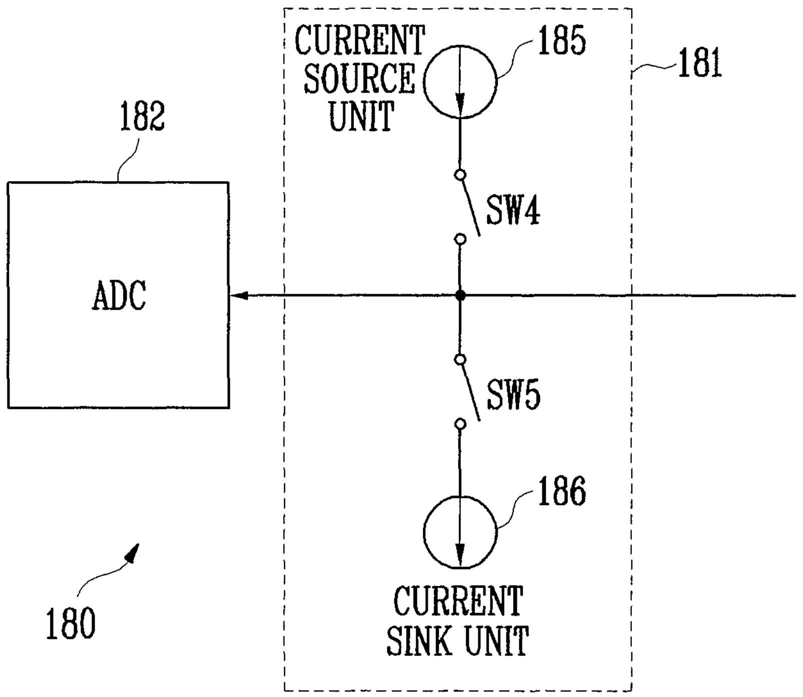
FIG. 5 is a detailed diagram showing the sensing circuit of FIG. 4.

As shown in FIG. 5, the sensing circuit 181 includes a current source unit 185, a current sink unit 186, and switching elements SW4 and SW5, respectively, coupled thereto.

The current source unit 185 supplies a first current to the pixel 140 when the fourth switching element SW4 is turned on. Herein, a predetermined voltage (first voltage) generated at the data line Dm when the first current is supplied to the ADC 182. The first current is supplied via the organic light emitting diode OLED included in the pixel 140.

In addition, as the organic light emitting diode OLED is deteriorated, the resistance value of the organic light emitting diode OLED is changed. Therefore, the voltage value of first voltage is changed corresponding to the deterioration of the organic light emitting diode OLED, such that the deterioration information of the organic light emitting diode OLED can be extracted.

Here, the current value of the first current is variously set so that a predetermined voltage can be applied within a limited time. For example, the first current may be set to the current value that is to be provided to the organic light emitting diode OLED when the pixel 140 is light-emitted at maximum brightness.

The current sink unit 186 sinks a second current from the pixel 140 when the fifth switching element SW5 is turned on. When the second current is sunk, a predetermined voltage (second voltage) generated at the data line Dm is supplied to the ADC 182. The second current is supplied via the second transistor M2 included in the pixel 140. Therefore, the threshold voltage and mobility information of the second transistor M2 is included in the second voltage. Here, the second current is set to have a current value so that the threshold voltage and mobility information of the driving transistor can be extracted stably. For example, the second current may be set to the same current value as the first current.

The ADC 182 converts the first voltage into a first digital value and converts the second voltage into a second digital value, thereby supplying them to the converting unit 190.

The converting unit 190 includes a memory 191 and a converting circuit 182.

The memory 191 stores the first digital value and the second digital value supplied from the ADC 182. Here, the memory 191 is stored with the threshold voltage and mobility information of the second transistor M2 and the deterioration information of the organic light emitting diode OLED, of the respective pixels 140 included in the display unit 130.

The converting circuit 192 converts input data Data transferred from the timing controller 150 into calibration data Data' so that an image having a uniform brightness can be displayed, irrespective of the deterioration of the organic light emitting diode OLED and the threshold voltage and mobility information of the driving transistor M2, by using the first digital value and the second digital value stored in the memory 191.

The data driver 120 generates a data signal using the calibration data Data' and supplies the generated data signal to the pixel 140.

Here, in FIG. 5 the sensing circuit 181 is shown to include the current sink unit 186, but the present invention is not limited thereto. Actually, the sensing circuit 181 may be implemented to include one or more current sink unit 186. For example, the sensing circuit 181 may be implemented to include two current sink units having two different current values. In this case, the threshold voltage and mobility information of the second transistor M2 is comprehended using the voltages each applied corresponding to the current of the two current sink units.

Figure 6:
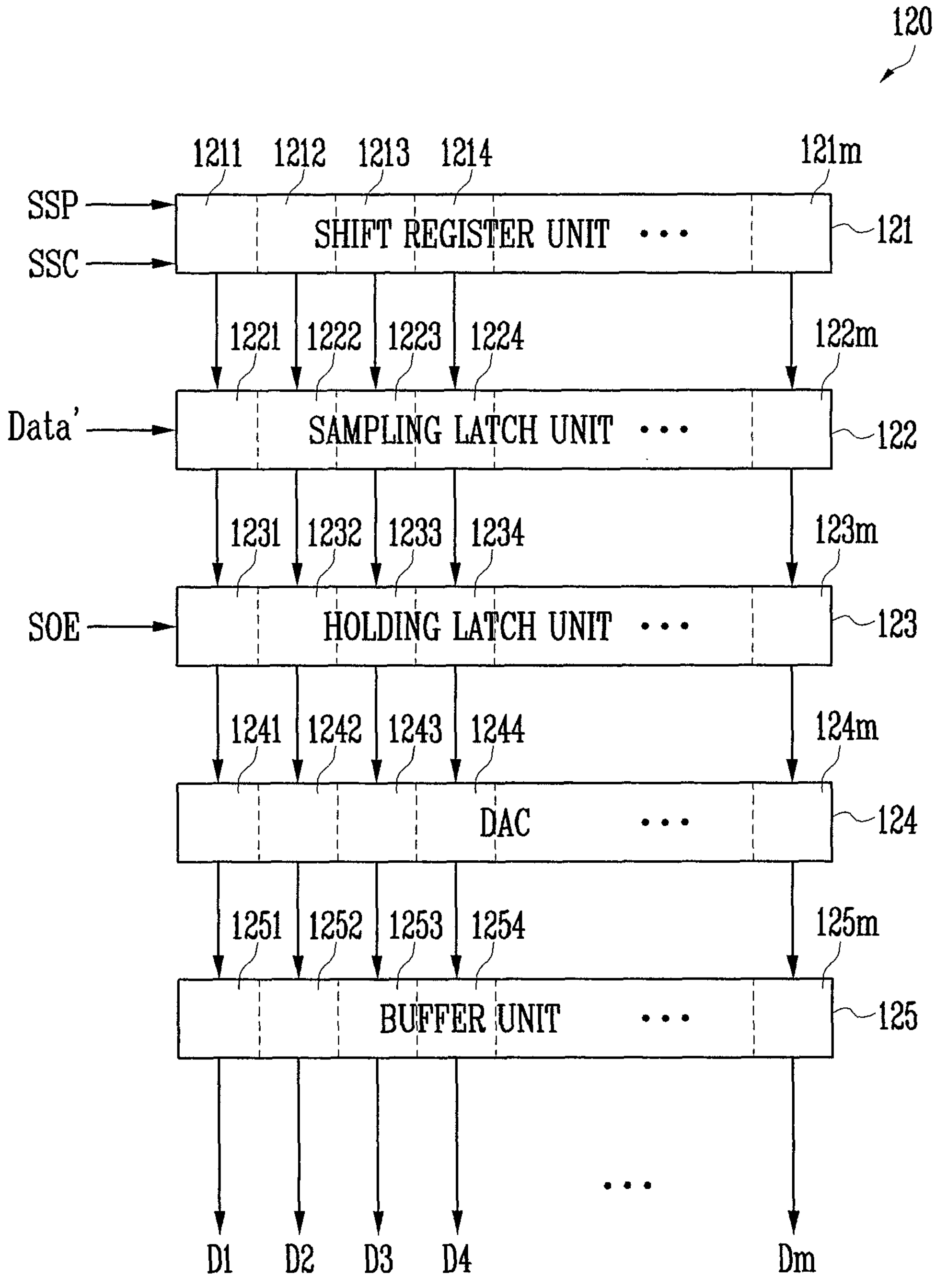
FIG. 6 is a block diagram showing the data driver of FIG. 4.

FIG. 6 is a block diagram showing an embodiment of the data driver according to the present invention.

Referring to FIG. 6, the data driver 120 includes a shift register unit 121, a sampling latch unit 122, a holding latch unit 123, a digital-analog converter (hereinafter, referred to as DAC) 124, and a buffer unit 125.

The shift register unit 121 receives a source start pulse SSP and a source shift clock SSC from the timing controller 150. The shift register unit 121 receiving the source start pulse SSP and the source shift clock SSC sequentially generates m sampling signals, while shifting the source start pulse SSP for each period of the source shift clock SSC. To this end, the shift register unit 121 includes m shift registers 1211 to 121*m*.

The sampling latch unit 122 sequentially stores the calibration data Data' in response to the sampling signals supplied sequentially from the shift register unit 121. To this end, the sampling latch unit 122 includes m sampling latches 1221 to 122*m* in order to store m calibration data Data'.

The holding latch unit 123 receives a source output enable SOE signal from the timing controller 150. The holding latch unit 123 receiving the source output enable SOE signal receives and store the calibration data Data' from the sampling latch unit 122. The holding latch unit 123 supplies the calibration data Data' stored in itself to the DAC 124. To this end, the holding latch unit 123 includes m holding latches 1231 to 123*m*.

The DAC 124 receives the calibration data Data' from the holding latch unit 123 and generates m data signals corresponding to the input calibration data Data'. To this end, the DAC 124 includes m DACs 1241 to 124*m*. In other words, the DAC 124 generates m data signals using the DACs 1241 to 124*m* positioned on the respective channels and supplies the generated data signals to the buffer unit 125.

The buffer unit 125 supplies the m data signals supplied from the DAC 124 to the m data lines D1 to Dm, respectively. To this end, the buffer unit 125 includes m buffers 1251 to 125*m*.

Figure 7:
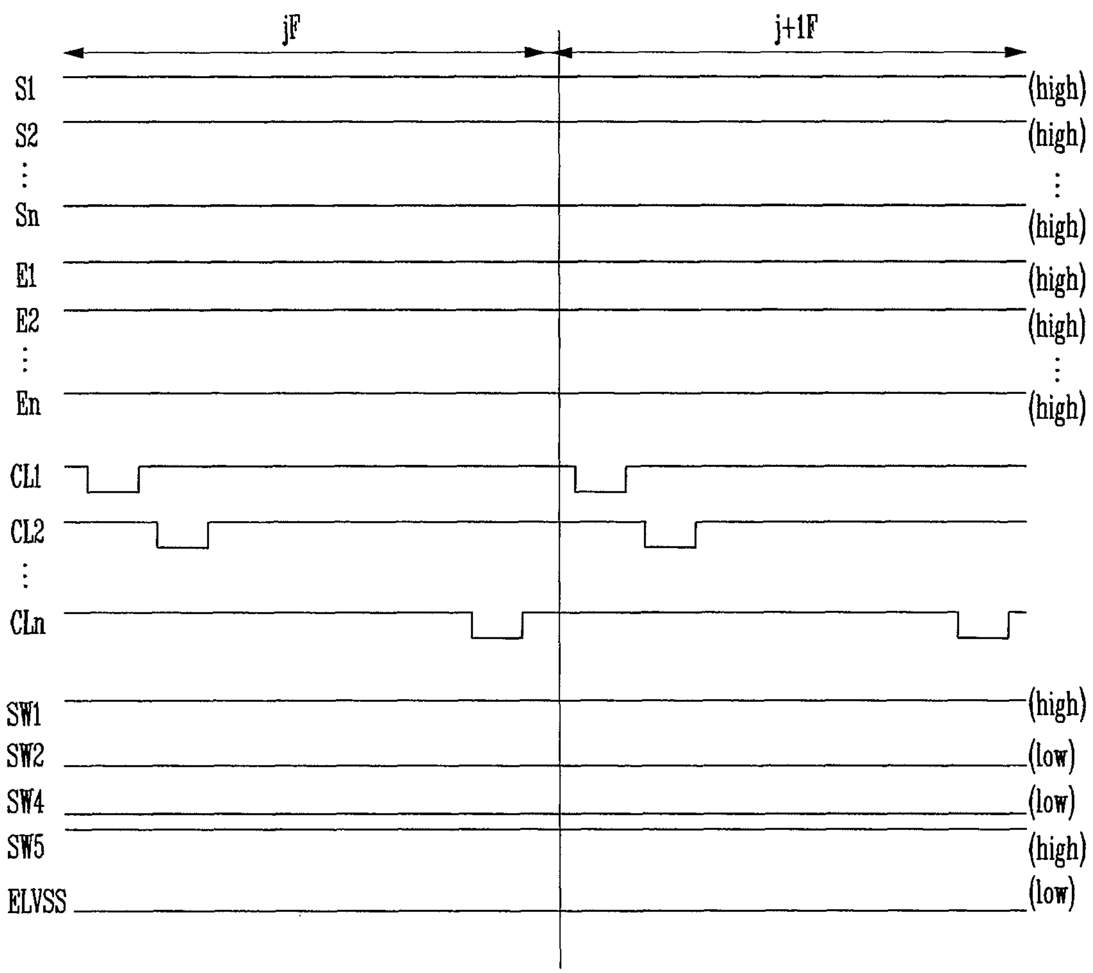
FIG. 7 is a diagram showing waveforms for extracting the deterioration information of the organic light emitting diode.

FIG. 7 is a diagram showing waveforms for extracting the deterioration information of the organic light emitting diode. In FIG. 7, it will be assumed that the deterioration information of the organic light emitting diode is extracted during the first non-display time before an image is displayed after power is applied to the organic light emitting display.

Referring to FIG. 7, a high-level voltage is applied to the scan lines S1 to Sn and the light emitting control lines El to En during the first non-display time. Sensing signals are sequentially supplied to the sensing lines CL1 to CLn during the respective times of j-th frame jF and (j+1)-th frame j+1F in the first non-display time.

Further, during the first non-display time, the first switching element SW1 and the fifth switching element SW5 receive a high-level voltage to be set to a turn-off state, and the second switching element SW2 and the fourth switching element SW4 receive a low-level voltage to be set to a turn-on state. The voltage of the second power supply ELVSS maintains a low level during the first non-display time.

If the sensing signal is supplied to the first sensing line CL1 during the j-th frame jF, the fourth transistor M4 of the pixels 140 coupled to the first sensing line CL1 is turned on. In this case, the first current from the current source unit 185 positioned on the respective channels is supplied to the second power supply ELVSS via the fourth transistor M4 and the organic light emitting diode OLED of the respective pixels 140.

Here, the first voltage generated at the anode electrode of the organic light emitting diode OLED is converted into the first digital value by the ADC 182, and the first digital value supplied from the ADC 182 is stored in the memory 191.

During the j-th frame jF, the sensing signals are sequentially supplied to the first sensing line CL1 to the n-th sensing line CLn, and the first digital value corresponding to the respective pixels 140 is stored in the memory 191.

Herein, the j-th frame jF is used as the period that parasitic capacitances between the data lines D1 to Dm and the pixels 140 are pre-charged. More specifically, during the j-th frame jF, the first digital values extracted from the pixels 140 coupled to some scan lines (for example, a first scan line S1, a second scan line S2, . . . ) are extracted before the parasitic capacitances between the data lines D1 to Dm and the pixels 140 are charged, such that the exact deterioration information is not extracted.

Therefore, according to an embodiment of the present invention, during the (j+1)-th frame j+1F after the j-th frame jF, the sensing signals are sequentially supplied to the first sensing lines CL1 to CLn, and the first digital values of the respective pixels 140 are re-extracted. In this case, the first digital values extracted during the (j+1)-th frame j+1F are stored in the memory 191. (That is, the first digital values stored in the j-th frame jF are deleted and the content of the memory is updated with the first digital values extracted from the (j+1)-th frame j+1F.)

As described in the above embodiment of the present invention, the first digital values of the pixels 104 are extracted during two or more frame periods that are continuous during the first non-display time. In this case, the first digital values extracted during the last frame period are stored in the memory 191, thereby making it possible to exactly (or accurately) extract the deterioration information of the organic light emitting diode OLED.

Figure 8:
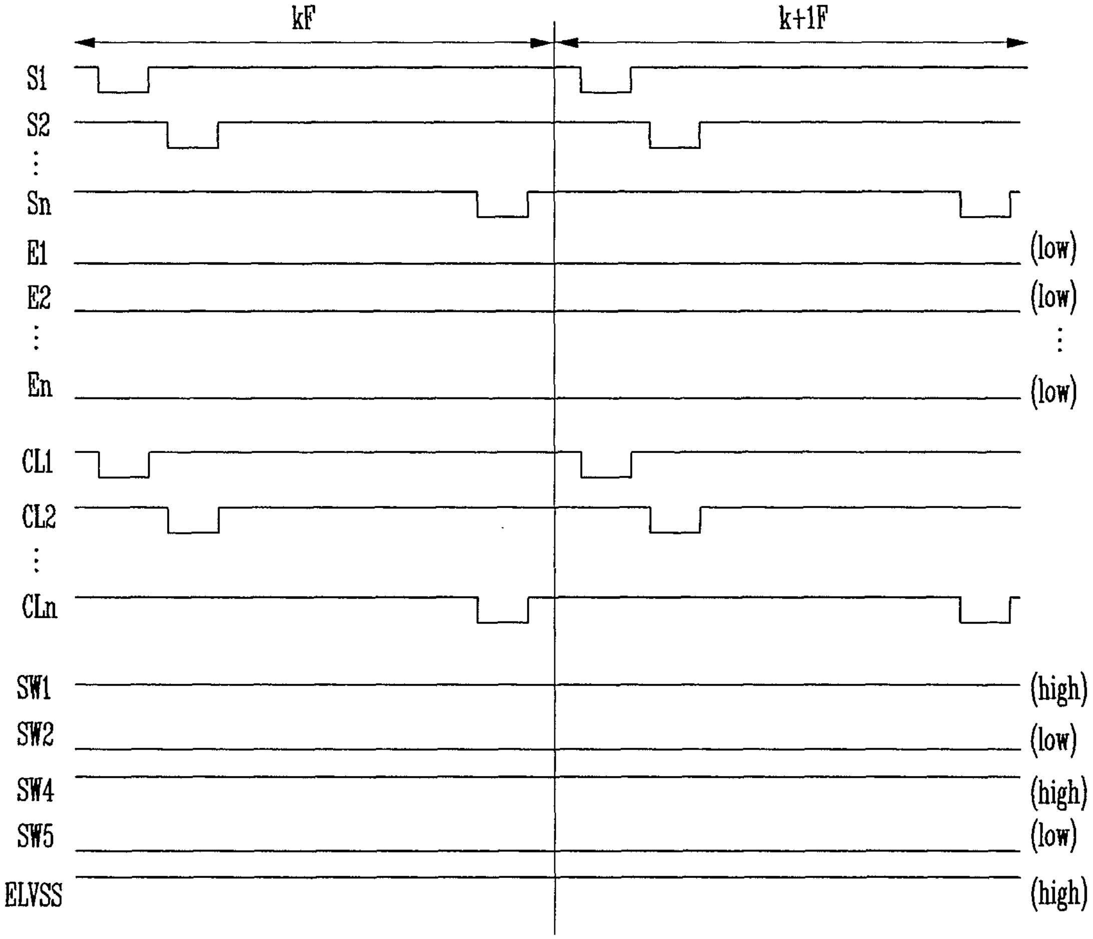
FIG. 8 is a diagram showing waveforms for extracting the threshold voltage and mobility information of the driving transistor.

FIG. 8 is a diagram showing waveforms for extracting the threshold voltage and mobility information of the driving transistor. In FIG. 8, it will be assumed that the threshold voltage and mobility information of the driving transistor is extracted during the second non-display time before an image is displayed after power is applied to the organic light emitting display.

Referring to FIG. 8, the scan signals are supplied sequentially to the scan lines S1 to Sn, and the sensing signals are supplied sequentially to the sensing lines CL1 to CLn during the second non-display time after the first non-display time. A voltage at low level is applied to the light emitting control lines E1 to En during the second non-display time.

Further, during the second non-display time, the first switching element SW1 and the fourth switching element SW4 receive a voltage at high level to be set to a turn-off state, and the second switching element SW2 and the fifth switching element SW5 receive a voltage at low level to be set to a turn-on state. During the second non-display time, the voltage of the second power supply ELVSS maintains a high level.

If the scan signal is supplied to the first scan line S1 during a k-th frame (k is a natural number) kF, the first transistor M1 of the pixels 140 coupled to the first scan line S1 is turned on. If the sensing signal is supplied to the first sensing line CL1 during the k-th frame kF, the fourth transistor M4 of the pixels 140 coupled to the first sensing line CL1 is turned on. In this case, the second current is sunk by the current sink unit 186 from the first power supply ELVDD via the second transistor M2, the third transistor M3, the fourth transistor M4, the data line and the fifth switching element SW5 included in the respective pixels 140 coupled to the first scan line S1.

Here, the second voltage generated at the gate electrode of the second transistor M2 is converted into the second digital value by the ADC 182, and the second digital value supplied from the ADC 182 is stored in the memory 191.

During the k-th frame kF, the scan signals are supplied sequentially to the scan lines S1 to Sn, and the sensing signals are supplied sequentially to the sensing lines CL1 to CLn, and the second digital values corresponding to the respective pixels 140 are stored in the memory 191.

Herein, the k-th frame kF is a time period where the parasitic capacitances between the data lines D1 to Dm and the pixels 140 are pre-charged. More specifically, during the k-th frame kF, the second digital values extracted from the pixels 140 coupled to some scan lines (for example, the first scan line S1, the second scan line S2, . . . ) are extracted before the parasitic capacitances between the data lines D1 to Dm and the pixels 140 are pre-charged, such that the exact (or accurate) deterioration information is not extracted.

Therefore, in an embodiment of the present invention, during a (k+1)-th frame k+1F after the k-th frame kF, the scan signals and the sensing signals are sequentially supplied, and the second digital values of the respective pixels 140 are re-extracted. In this case, the second digital values extracted during the (k+1)-th frame k+1F are stored in the memory 191. (That is, the second digital values stored in the k-th frame kF are deleted, and the content of the memory 191 is updated with the second digital values extracted from the (k+1)-th frame k+1F.)

As described in the above embodiment of the present invention, the second digital values of the pixels 140 are extracted during two or more continuous frame periods of the second non-display time. In this case, the second digital values extracted from the last frame period are stored in the memory 191, making it possible to exactly (or accurately) extract the deterioration information of the organic light emitting diode OLED.

Figure 9:
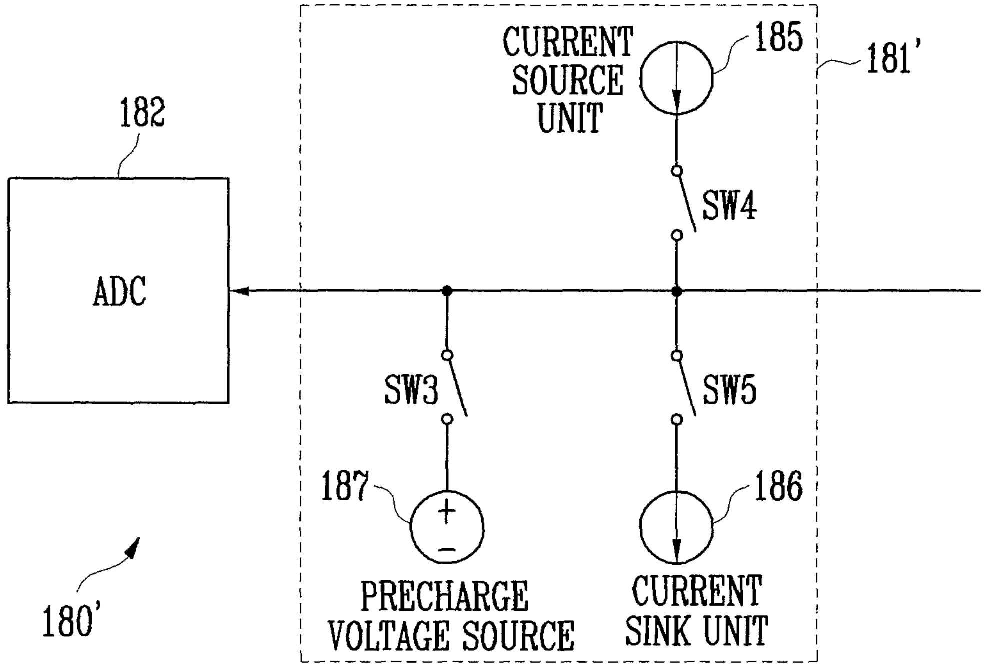
FIG. 9 is a schematic diagram showing another embodiment of the sensing circuit of FIG. 4.

FIG. 9 is a schematic diagram showing another embodiment of the sensing circuit of FIG. 4. In FIG. 9, the same portions as shown in FIG. 5 will be given the same reference numerals, and the detailed explanation thereof will be omitted.

Referring to FIG. 9, a sensing circuit 181' of a sensing unit 180' according to another embodiment of the present invention includes a current source unit 185, a current sink unit 186, a precharge voltage source 187, and switching elements SW4, SW5, and SW3, respectively, coupled thereto.

The precharge voltage source 187 supplies a pre-charge voltage to a data line when the third switching element SW3 is turned on. Herein, the precharge voltage is set to enable charging of parasitic capacitance between the data line and the pixels within a short time.

Figure 10:
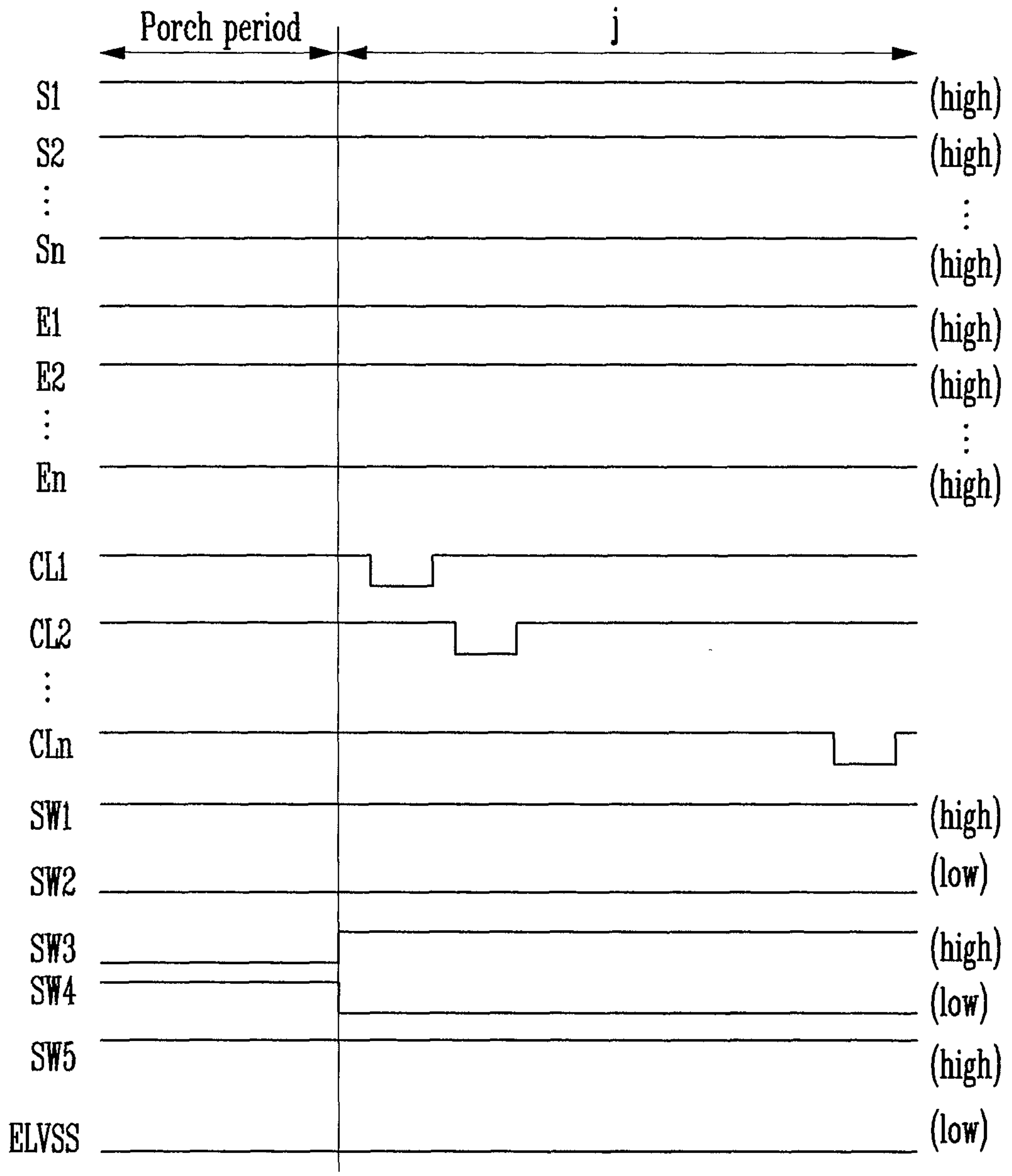
FIG. 10 is a diagram showing waveforms for extracting the deterioration information of the organic light emitting diode using the sensing circuit of FIG. 9.

FIG. 10 is a diagram showing waveforms for extracting the deterioration information of the organic light emitting diode using the sensing circuit of FIG. 9. In FIG. 10, it will be assumed that the deterioration information of an organic light emitting diode is extracted during a first non-display time before an image is displayed after power is applied to an organic light emitting display.

Referring to FIG. 10, during a porch period before a frame starts, parasitic capacitance of the data lines is pre-charged, and a first digital value is extracted during a following j-th frame jF period. Herein, the width of the porch period, which is the period between a frame and a next frame, is determined by the size (e.g., inch) and resolution, etc. of a panel.

First, during the porch period, all of the transistors included in the pixels 140 are set to be turned off. More specifically, during the porch period, voltage at a high level is supplied to scan lines S1 to Sn, light emitting control lines E1 to En, and sensing lines CL1 to CLn.

Further, during the porch period, the first switching element SW1, the fourth switching element SW4, and the fifth switching element SW5 receive a voltage at a high level to be set to a turn-off state, and the second switching element SW2 and the third switching element SW3 receive a voltage at a low level to be set to a turn-on state. During the porch period, the voltage of the second power supply ELVSS maintains a low level.

If the second switching element SW2 and the third switching element SW3 are turned on, a precharge voltage is supplied to the data lines D1 to Dm from the precharge voltage source 187. In this case, parasitic capacitances formed by the data lines D1 to Dm and the pixels 140 are pre-charged. (To this end, the precharge voltage is set to enable charging of the parasitic capacitances stably during the porch period.) Thereafter, during a j-th frame jF, the sensing signals are supplied sequentially to the sensing lines CL1 to CLn, and a first digital value of the pixels 140 is stored in a memory 191.

In other words, in the above described embodiments of the present invention, the parasitic capacitance is pre-charged using the precharge voltage source 187 during the porch period, and the first digital value is extracted during the following frame period jF. Therefore, during the frame jF period, the first digital value reflecting the deterioration information of the organic light emitting diode OLED can be stably extracted.

Figure 11:
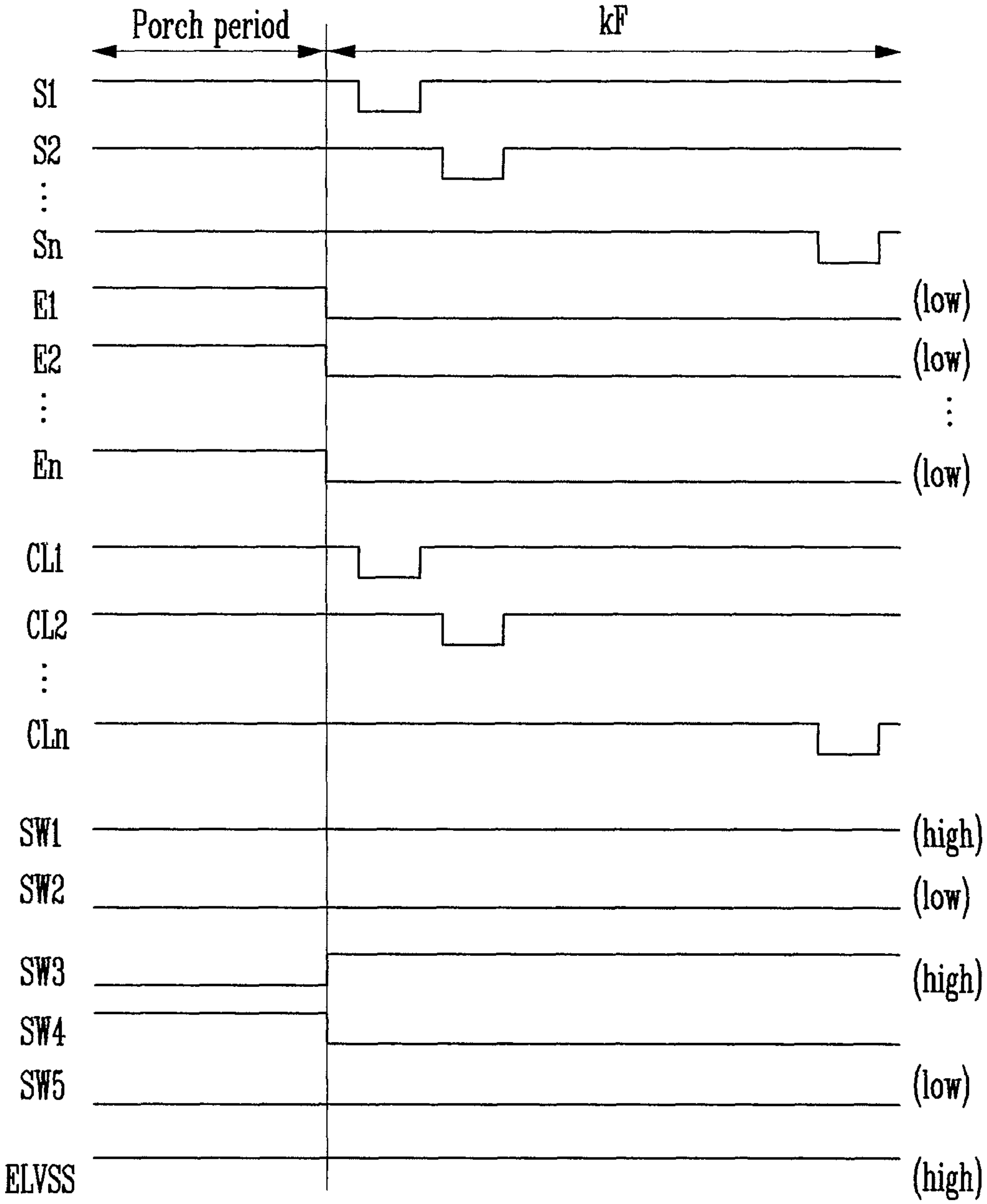
FIG. 11 is a diagram showing waveforms for extracting the threshold voltage and mobility information of the driving transistor using the sensing circuit of FIG. 9.

FIG. 11 is a diagram showing waveforms for extracting the threshold voltage and mobility information of the driving transistor using the sensing circuit of FIG. 9. In FIG. 11, it will be assumed that the threshold voltage and mobility information of the driving transistor is extracted during a second non-display time before an image is displayed after power is applied to the organic light emitting display.

Referring to FIG. 11, during the porch period before the frame starts, the parasitic capacitances of the data lines are pre-charged, and a second digital value is extracted during a following k-th frame kF period.

First, all of the transistors included in the pixels 140 are set to be turned off during the porch period. More specifically, during the porch period, a voltage at a high level is supplied to scan lines S1 to Sn, light emitting control lines E1 to En, and sensing lines CL1 to CLn.

Further, during the porch period, the first switching element SW1, the fourth switching element SW4 receive a voltage at a high level to be set to a turn-off state, and the second switching element SW2, the third switching element SW3 and the fifth switching element SW5 receive a voltage at a low level to be set to a turn-on state. During the porch period, the voltage of the second power supply ELVSS maintains a high level. Here, the voltage of the second power supply ELVSS can be freely selected to have a high level or a low level. However, during the k frame kF following the porch period, the voltage of the second power supply ELVSS is set to a high level, such that the voltage of the second power supply ELVSS is set to a high level even during the porch period in order to minimize power consumption.

If the second switching element SW2 and the third switching element SW3 are turned on, a precharge voltage is supplied to the data lines D1 to Dm from the precharge voltage source 187. In this case, the parasitic capacitances formed by the data lines D1 to Dm and the pixels 140 are pre-charged. Thereafter, during the k frame kF, the scan signals are supplied sequentially to the scan lines S1 to Sn and the sensing signals are supplied sequentially to the sensing lines CL1 to CLn, and a second digital value of the pixels 140 is stored in a memory 191.

In other words, in the above-described embodiments of the present invention, the parasitic capacitance is pre-charged using the precharge voltage source 187 during the porch period, and the second digital value is extracted during the following frame period kF. Therefore, during the frame kF period, the second digital value reflecting the threshold voltage and mobility information of the driving transistor can be stably extracted.

While the present invention has been described in connection with certain exemplary embodiments, it is to be understood that the invention is not limited to the disclosed embodiment, but, on the contrary, is intended to cover various modifications and equivalent arrangements included within the spirit and scope of the appended claims, and equivalents thereof.

What is claimed is:

1. A driving method of an organic light emitting display comprising:

generating first digital values by sensing deterioration information of organic light emitting diodes respectively included in a plurality of pixels coupled to a data line during two or more first continuous frame periods, the first digital values being generated for same pixels during each one of the first continuous frame periods;

storing the first digital values in a memory;

generating second digital values by sensing threshold voltage and mobility information of driving transistors respectively included in the plurality of pixels during two or more second continuous frame periods, the second digital values being generated for same pixels during each one of the second continuous frame periods;

storing the second digital values in the memory;

converting input data into calibration data according to information stored in the memory to display an image having a uniform brightness, irrespective of the deterioration information of the organic light emitting diodes and the threshold voltage and the mobility information of the driving transistors; and supplying a data signal in accordance with the calibration data to the data line, wherein the first continuous frame periods are non-display frame periods.

2. The driving method of the organic light emitting display as claimed in claim 1, wherein the generating the first digital values to the storing the second digital values are performed during a non-display time before the image is displayed after power is applied to the organic light emitting display.

3. The driving method of the organic light emitting display as claimed in claim 1, wherein the generating the second digital values and the storing the second digital values are performed during production of the organic light emitting display.

4. A driving method of an organic light emitting display comprising:

generating first digital values by sensing deterioration information of organic light emitting diodes respectively included in a plurality of pixels coupled to a data line during two or more first continuous frame periods;

storing the first digital values in a memory;

generating second digital values by sensing threshold voltage and mobility information of driving transistors respectively included in the plurality of pixels during two or more second continuous frame periods;

storing the second digital values in the memory;

converting input data into calibration data according to information stored in the memory to display an image having a uniform brightness, irrespective of the deterioration information of the organic light emitting diodes and the threshold voltage and the mobility information of the driving transistors; and supplying a data signal in accordance with the calibration data to the data line, wherein the generating the first digital values and the storing the first digital values comprise:

generating the first digital values corresponding to the deterioration information of the organic light emitting diodes respectively included in the pixels during a j-th frame period, wherein j is a natural number;

storing the first digital values in the memory;

generating the first digital values corresponding to the deterioration information of the organic light emitting diodes respectively included in the pixels during a (j+1)-th frame period; and deleting the first digital values stored in the j-th frame period and updating the information stored in the memory with the first digital values generated during the (j+1)-th frame period.

5. The driving method of the organic light emitting display as claimed in claim 4, wherein the generating the first digital values comprises:

supplying a first current to each of the organic light emitting diodes; and converting a first voltage applied to said each of the organic light emitting diodes in response to the first current into the first digital values.

6. A driving method of an organic light emitting display comprising:

generating first digital values by sensing deterioration information of organic light emitting diodes respectively included in a plurality of pixels coupled to a data line during two or more first continuous frame periods;

storing the first digital values in a memory;

generating second digital values by sensing threshold voltage and mobility information of driving transistors respectively included in the plurality of pixels during two or more second continuous frame periods;

storing the second digital values in the memory;

converting input data into calibration data according to information stored in the memory to display an image having a uniform brightness, irrespective of the deterioration information of the organic light emitting diodes and the threshold voltage and the mobility information of the driving transistors; and supplying a data signal in accordance with the calibration data to the data line, wherein the generating the second digital values and the storing the second digital values comprise:

generating the second digital values corresponding to the threshold voltage and the mobility information of the driving transistors respectively included in the pixels during a k-th frame period, wherein k is a natural number;

storing the second digital values in the memory;

generating the second digital values corresponding to the threshold voltage and the mobility information of the driving transistors respectively included in the pixels during a (k+1)-th frame period; and deleting the second digital values stored in the k-th frame period and updating the information stored in the memory with the second digital values generated during the (k+1)-th frame period.

7. The driving method of the organic light emitting display as claimed in claim 4, wherein the generating the second digital values comprises:

sinking a second current via each of the driving transistors; and converting a second voltage applied to a gate electrode of said each of the driving transistors in response to the second current into the second digital values.

* * * * *